United States Patent Office 3,553,172
Patented Jan. 5, 1971

3,553,172
ELASTIC POLYURETHANE POLYMERS FROM ISOCYANATE TERMINATED PREPOLYMERS AND AROMATIC POLYESTERS
Wilhelm Thoma, Bergisch-Neukirchen and Heinrich Rinke, Leverkusen, Germany, assignors to Farbenfabriken Bayer Aktiengesellschaft, Leverkusen, Germany, a corporation of Germany
No Drawing. Continuation-in-part of application Ser. No. 475,881, July 29, 1965. This application Feb. 18, 1969, Ser. No. 800,258
Claims priority, application Germany, Aug. 8, 1964, F 43,710
Int. Cl. C08g 22/08, 22/10, 53/00
U.S. Cl. 260—75                    15 Claims

ABSTRACT OF THE DISCLOSURE

Elastic filaments and foils are prepared by reacting an NCO-terminated prepolymer prepared from an aliphatic dihydroxy compound having a melting point less than 60° C. and an aromatic diisocyanate with an aromatic polyester having a melting point greater than 180° C.

---

This application is a continuation-in-part of application Ser. No. 475,881, filed July 29, 1965, now abandoned.

This invention relates to linear, segmented polyurethanes and filaments and foils thereof having a high tensile strength and a high elongation at break, and to a process for preparing these linear, segmented polyurethanes.

It is known to produce highly elastic foils and fibers using the isocyanate polyaddition process by reacting substantially linear, relatively high molecular polyhydroxy compounds such as polyesters or polyethers with polyisocyanates and then reacting the pre-adduct, which contains NCO groups, in solution, with chain-lengthening agents. As chain-lengthening agents may be used, for example, butanediol, 1,4 - phenylene-bis-oxyethylether, ethylene diamine, ethanolamine, hydrazine, carbohydrazide, and many other glycols, diamines and hydrazides. The elastomer present in solution is then freed from solvent and at the same time spun into threads, e.g. by the wet or dry spinning process, cast into foils or applied to surfaces such as textile surfaces. Of special interest are the highly elastic threads produced by this process in the manufacture of stretch fabrics such as corsets, brassieres, bathing wear, elastic stockings.

It is also known to react polyesters of terephthalic acid and aliphatic dicarboxylic acid and aliphatic dialcohols or mixtures of aliphatic and aromatic polyesters with an excess of polyisocyanate in the molten state and to pour the reaction products into molds, to harden out (crosslink) this composition by prolonged heating at elevated temperature before or after removal from the mold. Seals, gear wheels and similar articles are manufactured by this casting technique.

It is further known to react polyesters of molecular weight of about 2000 from aliphatic dicaryoxylic acids and glycols such as ethylene glycol or diethylene glycol together with a high melting polyester such as a polyester of terephthalic acid and ethylene glycol with an aliphatic diisocyanate, such as tetramethylene diisocyanate, in solution and to form this solution to produce elastic articles (Iwakura, Journal of Applied Polymer Science, 5; 108—1961).

The tensile strength of these elastomers is given as 240 kg./cm.$^2$, the elongation at break as 700%. If attempts are made to increase this tensile strength, which is rather low for practical textile purposes, by adding a higher proportion of the high melting polyester component, then the elongation at break drops to 100% while the tensile strength increases only to 370 kg./cm.$^2$.

It is an object of this invention to provide highly elastic filaments and foils from a linear, segmented polyurethane, said polyurethane being a reaction product of an NCO-terminated prepolymer with a polyester having a molecular weight of 500 to 5000. Furthermore, the present invention provides a process for the production of highly elastic polyurethanes and filaments or foils thereof by the isocyanate polyaddition process comprises reacting substantially linear, aliphatic polyhydroxy compounds with aromatic diisocyanates to form adducts containing NCO groups and then reacting these adducts, in solvents that are inert to NCO groups, with aromatic polyesters. The aliphatic polyhydroxy compounds which we prefer are substantially linear, have a molecular weight from about 500 to about 5000 and a melting point below 60° C. The aromatic polyesters which we prefer contain OH or COOH groups, have a molecular weight of about 500 to about 5000 and a melting point above 180° C.

The advantages of the process according to the present invention over the known method of Iwakura consist especially in that this process permits the production of elastic threads and foils which have both high tensile strength and at the same time high elongation at break.

These advantages are due mainly to the use of aromatic instead of aliphatic diisocyanates and to the reaction, taking place in a first reaction step, of the aliphatic polyhydroxyl compounds melting below 60° C. with polyisocyanates to form NCO pre-adducts which are then reacted in a second reaction step, in solution, with the aromatic, high melting polyesters which are used as chain-lengthening agents. Compared with the method of reacting low and high melting polyesters with polyisocyanates together in a single reaction vessel, the present process leads to elastomers having considerably improved elastic properties, which may be attributed to the fact that the polymer chains have a differnt statistical structure.

The following are examples of substantially linear, aliphatic polyhydroxy compounds of a molecular weight of 500 to 5000 which melt below 60° C.: polyesters of polycarboxylic acids and polyhydric alcohols, polyester amides, polyethers, polythioethers, polyacetals, poly-N-alkylurethanes and mixtures thereof; also, such compounds having ester-, ether-, acetal-, amide-, urethane-, N-alkylurethane- and urea groups. To obtain good elastic properties, especially at low temperatures, the melting points of the polyhydroxy compounds should preferably be below 45° C. The polyhydroxy compounds may also be modified with subequivalent quantities of diisocyanates with single or multiple pre-lengthening. Suitable high molecular polyhydroxy compounds are mentioned, for example, in British Pat. 917,450 and Belgian Pats. 636,976; 643, 811; 643,167; and 652,742.

Especially to be mentioned are polyesters of adipic acid and, if desired, mixtures of dialcohols having preferably more than 5 carbon atoms, because such polyesters have a relatively good resistance to hydrolysis; in addition, polyethers, preferably polytetramethylene ether diols, which may, if desired, be used as mixed polyethers, for example, after incorporating by polymerization small quantities of propylene oxide or ethylene oxide. Especially advantageous properties, such as high fastness to light, are achieved with such polyether derivatives the OH end groups of which have been replaced by an —O—CO—N(alkyl)—(CH$_2$)$_2$—OH— group (Belgian Pat. 652,742).

The aromatic diisocyanates useful in this invention include, for example, 1,4-phenylene-, 1,3-phenylene-, toluylene-2,4- and/or 2,6-diisocyanate, diphenyl-4,4'-, diphenylmethane-4,4'-, diphenyldimethylmethane-4,4'-, benzophenone-4,4'-diisocyanate, diphenylether- or diphenylsulphide diisocyanate and substitution products thereof, e.g. derivatives substituted with alkyl-, alkoxy-, halogen or nitro groups such as 3,3'-dimethyl- or 3,3'-dimethoxy- or 3,3'-dichlorodiphenyl-4,4'-diisocyanate. Diisocyanates of the naphthalene series or heterocyclic diisocyanates such as 1,5 - naphthylene-diisocyanate or benzofuran - 2,7 - diisocyanate may also be mentioned as examples. It is preferred to use symmetrical diisocyanates such as diphenyl - 4,4' - diisocyanates or diphenylmethane-4,4'-diisocyanate. Suitable for the above prelengthening of the polyhydroxy compounds with subequivalent quantities of diisocyanate are, in addition to the aromatic diisocyanates listed above, also aliphatic and cycloaliphatic diisocyanates such as hexamethylene diisocyanate or 1,4 - cyclohexane diisocyanates.

For the preparation of NCO preadducts, the high molecular aliphatic polyhydroxy compounds are reacted with aromatic diisocyanates, about 1.5 to 3.5 mols, preferably 1.5 to 2.0 mols, of diisocyanate being suitably used for 1.0 mol of polyhydroxy compound. The reaction of the polyhydroxy compound, which has been dried by heating for about one hour at 100 to 150° C. in a vacuum of 6 to 50 mm. Hg, with the diisocyanates is carried out in known manner in the melt at about 80 to 120° C., preferably 90 to 110° C., or by reaction in inert solvents. Suitable solvents are, for example, methylene chloride, carbon tetrachloride, benzene, chlorobenzene, methyl ethyl ketone, tetrahydrofuran, dioxane, glycol monomethyl ether acetate, glycol formal, dichlorobenzene, trichlorobenzene, nitrobenzene, methylbenzoate and acetophenone.

In the reaction in solvents, especially relatively low boiling solvents such as methylene chloride, the solvents can be distilled off as the reaction proceeds or, alternatively, the NCO pre-adduct may remain in solution, e.g. in dioxane, since, in general, such solutions of the NCO pre-adducts are easier to work up than the melts owing to their lower viscosity. However, at elevated temperature (80 to 100° C.), the solvent-free melts of the NCO pre-adducts also have sufficiently low viscosities to enable them to be rapidly dissolved or mixed as the reaction continues.

According to the invention, suitable chain-lengthening agents for the reaction of the NCO pre-adducts are aromatic polyesters which contain OH and/or COOH groups and have melting points above 180° C. These polyesters should have a molecular weight of 500 to 5000, preferably 1800 to 2500. They are obtained by known methods, e.g. by esterification of dicarboxylic acids with dialcohols or by ester interchange of dicarboxylic acid alkyl esters or -hydroxyalkyl esters with dialcohols. The melting points of the polyesters should lie generally between 180 and 260° C., and especially between 200 and 240° C. Mixtures of two or more of such polyesters can be reacted with the pre-adduct.

The following are examples of aromatic acids which are used as such or in the form of their polyester-forming derivatives to form polyesters having melting points above 180° C.: terephthalic acid, isophthalic acid, diphenyl-4,4'-dicarboxylic acid, diphenylsulphone-4,4'-dicarboxylic acid, diphenylether - 4,4' - dicarboxylic acid, benzophenone - 4,4' - dicarboxylic acid, naphthalene-2,6- and -2,7- dicarboxylic acids, ethane-diphenylether - 4,4' - dicarboxylic acid.

The following dialcohols, for example, may be used for esterification: ethylene glycol, propane - 1,3 - diol, butane - 1,4 - diol, hexane - 1,6 - diol, 2,2 - dimethylpropane - 1,3 - diol, diglycol, xylylene glycol - 1,3 or -1,4-, 1,4-bisoxymethyl cyclohexane.

Optionally, the aromatic polyester used in the reaction with the NCO-terminated pre-adduct may contain up to 50 mol percent of non-aromatic constituent. The non-aromatic constituent can be introduced into the polyester molecule itself by forming the polyester of a mixture of aliphatic and aromatic dicarboxylic acids and aliphatic dialcohol. Examples of non-aromatic acids which may be used are: succinic acid, adipic acid, ether dipropionic acid, 1,4-cyclohexanedicarboxylic acid, 4-carboxyphenylpropionic acid, and 1,4-phenyleneether diacetic acid. Alternately, the non-aromatic constituent may itself be a compound which is reactive with the NCO pre-adduct by virtue of reactive hydrogen atoms, and is reacted with the pre-adduct concurrently with the aromatic polyester. Such reactive compounds include polyhydroxy compounds as well as dihydroxyamides, ureas or hydrazodicarboxylic acid amides, preferably melting above 160° C., e.g. diphenylmethane - 4,4' - di - ($\beta$-hydroxyethyl)-urea, diphenylmethane - 4,4' - di - (4 - hydroxycyclohexyl)-urea, oxalic acid-di-($\beta$-hydroxyethyl)-amide, 1,4 - cyclohexane-di-($\gamma$ - hydroxybutyric acid)-amide, terephthalic acid - di - ($\gamma$ - hydroxypropyl)-amide, hydrazodicarboxylic acid-($\gamma$-hydroxypropyl)-amide.

Suitable for use for the preparation of solutions of the chain-lengthening agents melting above 180° C. for the subsequent reaction are, for example, solvents boiling above 150 to 330° C. which are inert to NCO groups, e.g. c-, m-, p-dichlorobenzene or their technical isomeric mixtures, trichlorobenzenes, especially their technical isomeric bixtures, bromobenzene, dibromobenzene, o-, m-, p-chlorotoluene, dichlorotoluenes, chloroxylenes, nitrobenzenes, mononitrotoluenes, monochloro-mononitro benzenes, methyl-, ethyl-, and benzyl-benzoate, p-tolyl acid ethyl ester, and acetophenone. Solvents such as dimethylformamide, dimethylsulphoxide and tetramethyl urea may also be included.

The reaction of the NCO pre-adducts with the aromatic polyesters, if desired with inclusion of up to 50 mol perecnt of aliphatic polyesters, dihydroxy amides, -ureas and -hydrazodicarboxylic acid amides melting at 160° C., may be carried out by heating the melt or solution of the NCO pre-adduct to 80 to 180° C., especially 90 to 130° C., and combining it with the solution of high melting, chain-lengthening agent heated to 150 to 230° C., especially 160 to 200° C. The reaction mixture is maintained for 60 to 300 minutes, especially 90 to 180 minutes at 150 to 200° C., preferably 170 to 190° C.

The ratio of the NCO groups of the NCO pre-adduct to the OH and/or COOH groups of the high melting chain-lengthening agents should be greater than or equal to 1.10, especially between 1.10 and 2.4 and preferably between 1.2 and 1.7.

The elastomers can be formed directly from the hot reaction solutions by known processes, e.g. by wet or dry spinning or by casting into foils. Formation of the elastomers from the hot solutions is particularly suitable since they tend to gel at room temperature. An especially suitable process for forming the elastomers is the so-called dry spinning process in which spinning velocities of 100 to 800 m./min. can be achieved. The wet spinning process is sometimes less suitable because the elastomer solutions in many cases contain organic solvents which are immiscible with water so that it is necessary to use precipitating baths which are non-aqueous or at least contain a high proportion of organic solvents. Elastomer filaments may also be produced by cutting from foils of about 0.10 to 0.20 mm. in thickness by means of a foil-cutting machine. Elastomer foils or coatings can be obtained by painting, casting or doctoring on solid foundations or textile fabrics.

The properties of the filaments or foils are determined as follows:

TS=tensile strength (in g./den.) on a Wolpert instrument $elg$=elongation (percent) (Wolpert instrument)

TS(B)=tensile strength (in g./den.) at break titre (converted).

The elastic properties are determined with the Elasto-Tensograph (Farbenfabrik Bayer Aktiengesellschaft) described in Chimia 16, 93–105 (1962).

Preferably, the following values are determined:

M 300=tension in mg./den. at 300% elongation of the thread at 400% per minute speed of elongation M 150=tension at 150% elongation in the third release cycle after 3 times elongation to 300% at a speed of 400% per minute Tension drop=percent tension drop at elongation to 300% after 30 seconds waiting at 300% elongation Permanent elongation=percent permanent elongation after 3 elongation-release cycles (each time 300% maximum elongation. Speed of elongation 400% per min.), 30 seconds after release of the thread.

The invention is illustrated by the following examples.

EXAMPLE 1

100 g. of a mixed polyester of adipic acid, ethylene glycol and butane diol (molar ratio of the glycols 1:1, OH number 55.0, acid number 0.7) are heated to 100° C. for 60 minutes with (a) 17.6 g., (b) 21.5 g., (c) 25.0 g. of 4,4′-diphenylmethane diisocyanate after dewatering for one hour at 130°/12 mm. Hg. The NCO pre-adducts ((a)-(c)) are each dissolved in 75 g. of nitrobenzene; to these solutions are added solutions heated to 170° C. of a polyester of terephthalic acid, ethylene glycol, butane-1,4-diol (molar ratio of the clycols 9:1, molecular weight 2000, melting point 240 to 245° C.). The quantities are (a) 17.7 g. of polyester in 235 g. of nitrobenzene, (b) 42.8 g. of polyester in 310 g. of nitrobenzene, (c) 75 g. of polyester in 390 g. of nitrobenzene. After adding the solutions of the high melting product to the NCO pre-adduct solutions, the reaction mixtures are kept for 3 hours at 150° C.

The hot elastomer solutions are cast into films on glass surfaces, the nitrobenzene is evaporated in 60 minutes at 120° C. in a drying cupboard with circulating air. The highly elastic films of thickness 0.1 to 0.3 mm. are cut with a filament-cutting machine to filaments of about 800 to 1000 den. The K-values of the elastomers (10 g./litre, phenol/tetrachloroethane=6:4) lie between 85 and 90.

Physical properties of the three polymers are shown in Table I below:

TABLE I

|  | a | b | c |
|---|---|---|---|
| Melting point, ° C | 210–225 | 225–230 | 225–230 |
| Film: |  |  |  |
| Thickness, mm | 0.14 | 0.15 | 0.33 |
| TS kg./cm.² | 438 | 718 | 566 |
| Elongation, percent | 700 | 615 | 580 |
| TS-break kg./cm.² | 3,500 | 5,120 | 3,850 |
| M 20 kg./cm.² | 17 | 44 | 71 |
| M 300 kg./cm.² | 56 | 175 | 231 |
| Microhardness | 57 | 82 | 90 |
| Filaments: |  |  |  |
| Titre, den | 1,038 | 1,279 | 1,088 |
| TS, g./den | 0.39 | 0.65 | 0.77 |
| Elongation, percent | 840 | 800 | 820 |
| TS-break, g./den | 3.65 | 5.80 | 7.10 |
| M 300, mg./den | 42 | 96 | 172 |
| M 150, mg./den | 13 | 18 | 18 |
| Tension drop, percent | 15 | 20 | 25 |
| Permanent elongation, percent | 18 | 20 | 35 |

EXAMPLE 2

100 g. of the polyester from Example 1 are heated for 60 minutes at 100° C. with 21.5 g. of 4,4′-diphenylmethane diisocyanate and then dissolved in 75 g. of nitrobenzene. To this NCO pre-adduct solution is added the 180° C. hot solution of 42.8 g. of a polyester of terephthalic acid and ethylene glycol (molecular weight 2000, M.P. 255–258° C.) in 290 g. of nitrobenzene and the reaction is left to proceed for 3 hours at 180° C. The elastomer solution is formed into films as in Example 1 and threads are cut from these films. The following properties were measured: melting point 230–250° C., and are shown in Table II below.

TABLE II

| Film: |  |
|---|---|
| Thickness | 0.17 |
| TS | 627 |
| Elongation | 660 |
| TS–B | 4750 |
| M 20 | 32 |
| M 300 | 146 |
| Microhardness | 72 |
| Filaments: |  |
| Titre | 864 |
| TS | 0.58 |
| Elongation | 870 |
| TS–B | 5.6 |
| M 300 | 87 |
| M 150 | 15 |
| Tension drop | 22 |
| Permanent elongation | 26 |

EXAMPLE 3

100 g. of polyhydroxytetramethyleneether (OH number 43) are heated for 60 minutes to 100° C. with 18.3 g. of 4,4′-diphenylmethane diisocyanate and the melt is then dissolved in 75 g. of methylbenzoate. To this NCO pre-adduct solution is added a 170° C. hot solution of 46.2 g. of a polyester of terephthalic acid, ethylene glycol and butane diol in 300 g. methylbenzoate and the reaction mixture is kept for 3 hours at 150° C. while pure nitrogen is passed over. The hot elastomer solution is formed as in Example 1. The following properties were measured in the films and filaments: melting point 220–230° C., and are shown in Table III below.

TABLE III

| Film: |  |
|---|---|
| Thickness | 0.14 |
| TS | 411 |
| Elongation | 730 |
| TS–B | 3400 |
| M 20 | 27 |
| M 300 | 136 |
| Threads: |  |
| Micro hardness | 76 |
| Titre | 807 |
| TS | 0.46 |
| Elongation | 920 |
| TS–B | 4.7 |
| M 300 | 104 |
| M 150 | 18 |
| Tension drop | 23 |
| Permanent elongation | 30 |

EXAMPLE 4

100 g. of a mixed polyester of adipic acid, hexane-1,6-diol and 2,2-dimethylpropane-1,3-diol (molar ratio of glycols 0.65:0.35; reaction number 67.5) are heated for 60 minutes at 100° C. with (a) 25.9 g., (b) 23.4 g., (c) 21.9 g., (d) 21.1 g. of 4,4′-diphenylmethane diisocyanate after dewatering for one hour at 130° C./12 mm. Hg and then dissolved in 75 g. of nitrobenzene. The NCO pre-adducts (a), (b), (c), (d) are reacted with solutions of 51.9 g., 42.2 g., 42.2 g., 42.2 g. of a polyester of terephthalic acid, ethylene glycol and butane-1,4-diol (molar ratio of glycols 9:1, molecular weight 2000, melting point 245–250° C.) in 340 g., 235 g., 230 g., 230 g. of nitrobenzene. The reaction solutions are in each case heated for 2 hours at 170° C. The hot elastomer solutions are formed as described in Example 1 and the properties measured in the threads and films as shown in Table IV below:

TABLE IV

|  | a | b | c | d |
|---|---|---|---|---|
| Melting point, °C | 225–230 | 220–225 | 220–225 | 225–230 |
| Film: |  |  |  |  |
| Thickness, mm | 0.21 | 0.13 | 0.18 | 0.22 |
| TS, kg./cm.$^2$ | 635 | 718 | 590 | 656 |
| Elongation, percent | 540 | 550 | 570 | 635 |
| TS–B, kg./cm.$^2$ | 4,075 | 4,670 | 3,900 | 4,800 |
| M 20, kg./cm.$^2$ | 49 | 47 | 37 | 29 |
| M 300, kg./cm.$^2$ | 227 | 176 | 174 | 141 |
| Microhardness | 83 | 81 | 81 | 69 |
| Filaments: |  |  |  |  |
| Titre, den | 1,347 | 786 | 934 | 1,209 |
| TS, g./den | 0.60 | 0.47 | 0.50 | 0.62 |
| Elongation, percent | 560 | 540 | 595 | 800 |
| TS–B, g./den | 4.0 | 3.0 | 4.5 | 5.6 |
| M 300, g./den | 164 | 124 | 114 | 85 |
| M 150, mg./den | 21 | 18 | 18 | 15 |
| Tension drop, percent | 22 | 25 | 21 | 22 |
| Permanent elongation, percent | 26 | 21 | 18 | 20 |

If 100 g. of the mixed polyester described at the beginning are reacted with 21.9 g. of 4,4'-diphenylmethane diisocyanate to form a pre-adduct and this is left to react for 2 hours at 170° C. with 63.2 g. of a polyester of terephthalic acid, ethylene glycol, butane-1,4-diol (molecular weight 3000, melting point 235–240° C.) dissolved in 355 g. of nitrobenzene, an elastomer solution is obtained from which foils and filaments having the following properties (Table V) can be produced.

TABLE V

Film:
  Thickness _____ 0.14
  TS _____ 665
  Elongation _____ 600
  TS–B _____ 4650
  M 20 _____ 33
  M 300 _____ 183
Filaments:
  Micro hardness _____ 76
  Titre _____ 982
  TS _____ 0.56
  Elongation _____ 710
  TS–B _____ 4.55
  M 300 _____ 121
  M 150 _____ 15
  Tension drop _____ 25
  Permanent elongation _____ 24

EXAMPLE 5

100 g. of the mixed polyester described in Example 4 of adipic acid, hexane-1,6-diol and 2,2-dimethylpropane-1,3-diol are heated for 60 minutes at 100° C. with 21.9 g. of 4,4'-diphenylmethane diisocyanate. The NCO pre-adduct melt is then dissolved in 75 g. of acetophenone. To a solution of 88.6 g. of the high melting polyester from Example 1 and 0.67 g. of 4,4'-diphenylmethane-bis(β-hydroxyethylurea) in 240 g. of acetophenone is added the NCO pre-adduct solution and the mixture left to react for 3 hours at 170° C. The viscous elastomer solution is cast to foils while still hot (about 120° C.). Foils and filaments have the following properties: M.P. 210°–220° C.

TABLE VI

Film:
  Thickness _____ 0.21
  TS _____ 504
  Elongation _____ 535
  TS–B _____ 3200
  M 20 _____ 21
  M 300 _____ 129
  Microhardness _____ 77
Filaments:
  Titre _____ 1266
  TS _____ 0.46
  Elongation _____ 580
  TS–B _____ 3.1
  M 300 _____ 97
  M 150 _____ 18
  Tension drop _____ 15
  Permanent elongation _____ 19

EXAMPLE 6

100 g. of a mixed polyester of adipic acid, hexane-1,6-diol and 2,2'-dimethylpropane-1,3-diol (molar ratio of glycols 0.60:0.40; molecular weight 2000) are mixed, before dewatering, with 0.1 ml. of a 30% sulphur dioxide solution in dioxane and heated for one hour at 130° C. at 12 mm. Hg. The polyester is heated for 60 minutes at 100° C. with 19.4 g. of 4,4'-diphenylmethane diisocyanate and dissolved in 75 g. of nitrobenzene. A solution of 40 g. of high melting polyester from Example 1 in 295 g. of nitrobenzene is added to the NCO pre-adduct solution. The reaction mixture is heated for 2 hours at 170° C. The elastomer solution is formed in foils as in Example 1; these foils and the filaments cut from them have the following properties.

TABLE VII

Film:
  Thickness _____ 0.15
  TS _____ 580
  Elongation _____ 645
  TS–B _____ 4300
  M 20 _____ 26
  M 300 _____ 105
  Microhardness _____ 70
Filaments:
  Titre _____ 783
  TS _____ 0.59
  Elongation _____ 710
  TS–B _____ 4.7
  M 300 _____ 95
  M 150 _____ 19
  Tension drop _____ 18
  Permanent elongation _____ 18

EXAMPLE 7

100 g. of the mixed polyester from Example 4 are heated for 30 minutes at 100° C. with 15.8 g. of toluylene diisocyanate (isomeric mixture 2,6-:2,4-=20:80) and then dissolved in 75 g. of nitrobenzene. The NCO pre-adduct solution is combined with a solution of 48 g. of the high melting polyester from Example 1, 235 g. of nitrobenzene, and 45 g. of dimethylformamide and left to react for 15 minutes at 150° C. Foils are produced from the hot elastomer solution and filaments are cut from the foils. Foils and filaments have the following properties: M.P. 200°–210° C.

TABLE VIII

Film:
  Thickness _____ 0.18
  TS _____ 452
  Elongation _____ 650
  TS–B _____ 4300
  M 20 _____ 30
  M 300 _____ 127
  Microhardness _____ 78
Filaments:
  Titre _____ 1424
  TS _____ 0.53
  Elongation _____ 760
  TS–B _____ 4.6
  M 300 _____ 99
  M 150 _____ 15
  Tension drop _____ 21
  Permanent elongation _____ 27

EXAMPLE 8

100 g. of the mixed polyester from Example 6 are heated for 30 minutes at 100° C. with 18.8 g. of 4,4'-diphenylmethane diisocyanate and dissolved in 75 g. of nitrobenzene. 50 g. of a polyester of terephthalic acid, adipic acid, and ethylene glycol ratio of acid components 0.80:0.20, molecular weight 2500, M.P. 210°–216° C.) are dissolved in 320 g. of nitrobenzene. The two solutions are combined and heated for 2 hours at 270° C. The foils and filaments produced from the elastomer solution have the following properties.

TABLE IX

Film:
| | |
|---|---|
| Thickness | 0.14 |
| TS | 405 |
| Elongation | 605 |
| TS–B | 2850 |
| M 20 | 19.5 |
| M 300 | 88 |
| Microhardness | 71 |

Filaments:
| | |
|---|---|
| Titre | 668 |
| TS | 0.53 |
| Elongation | 790 |
| TS–B | 4.7 |
| M 300 | 63 |
| M 150 | 14 |
| Tension drop | 13 |
| Permanent elongation | 27 |

Although the invention has been described in considerable detail with reference to certain preferred embodiments thereof, it will be understood that variations and modifications can be effected within the spirit and scope of the invention as described above and as defined in the appended claims.

What is claimed is:

1. Process for the production of a segmented elastic polyurethane filament or foil comprising reacting an aliphatic polyhydroxy polyester or polyether with an aromatic diisocyanate to form an NCO-terminated pre-adduct, subsequently reacting said pre-adduct with an aromatic polyester in a solvent inert to NCO groups and forming a foil or filament from the resulting solution.

2. Process of claim 1 wherein said aliphatic polyester or polyether has a melting point below 60° C. and said aromatic polyester has a melting point above 180° C.

3. Process of claim 1 wherein said aliphatic polyester or polyether is reacted with about 1.5 to about 3.5 mols of said diisocyanate to form said pre-adduct, and the ratio of NCO groups to OH or COOH groups in said aromatic polyester in said subsequent reaction is at least 1.1 to 1.

4. Process of claim 1 wherein said subsequent reacting is with aromatic polyester and up to 50 mol percent of an aliphatic compound having a reactive hydrogen atom.

5. A method for making segmented polyurethane filaments or foils having improved tensile strength and elongation which comprises reacting in a solvent inert to —NCO groups (1) an —NCO-terminated prepolymer prepared by a process which comprises joining aliphatic substantially linear organic polyhydroxy compound moieties having a melting point below about 60° C. and a molecular weight between about 500 and about 5000 by reaction with an aromatic diisocyanate with (2) an aromatic polyester having a molecular weight between about 500 and about 5000 and melting above about 180° C., and forming a foil or filament from the resulting solution.

6. An elastic segmented polyurethane filament or foil comprising alternating segments which are the reaction product of
(A) an NCO-terminated prepolymer formed by the reaction of
(1) a dihydroxy aliphatic polyester or polyether, and
(2) an aromatic diisocyanate, and
(B) a polyester of a dibasic aromatic acid.

7. Polyurethane of claim 6 wherein (B) further comprises a compound reactive with NCO selected from polyhydroxy aliphatic polyesters, dihydroxyamides, ureas, and hydrazodicarboxylic acid amides, in an amount up to 50 mol percent based upon said polyester of a dibasic aromatic acid.

8. The foil or filament of claim 6 wherein said polyester of a dibasic aromatic acid and said aliphatic polyester or polyether have a molecular weight between about 500 and about 5000.

9. The foil or filament of claim 6 wherein said polyester of a dibasic aromatic acid has a melting point above about 180° C. and said aliphatic polyester or polyether has a melting point below about 60° C.

10. The foil or filament of claim 1 wherein said polyester of a dibasic aromatic acid is a polyester of terephthalic acid and at least one diol.

11. The foil or filament of claim 10 wherein said diol is ethylene glycol, butane diol, or a mixture thereof.

12. The foil or filament of claim 6 wherein said polyester of a dibasic aromatic acid is a polyester of terephthalic acid and up to 50 mol percent of an aliphatic diacid and a diol.

13. The foil or filament of claim 6 wherein said aliphatic polyester is a polyester of adipic acid and at least one diol.

14. The foil or filament of claim 4 wherein said diol is ethylene glycol, butane diol, hexane diol, dimethylpropane diol, or a mixture thereof.

15. A substantially linear segmented polyurethane filament or foil having a tensile strength of from about 400 to about 700 kg./cm.$^2$ and an elongation at break of from about 500 percent to about 700 percent consisting essentially of alternating segments of (1) a polyurethane prepolymer prepared by joining moieties of an aliphatic polyhydroxy compound having a molecular weight between about 500 and about 5000 and a melting point below about 60° C. by reaction with an aromatic diisocyanate and (2) a polyester of a diabasic aromatic acid having a molecular weight between about 500 and 5000 and a melting point above about 180° C., said segments (1) and (2) being joined by links formed by reaction of terminal —NCO groups on (1) with terminal —OH or —COOH groups on (2).

References Cited

UNITED STATES PATENTS

| 3,305,533 | 2/1967 | Thoma et al. | 260—75 |
| 3,388,100 | 6/1968 | Thoma et al. | 260—75 |
| 2,779,689 | 1/1957 | Reis | 117—104 |

FOREIGN PATENTS

| 132,546 | 5/1949 | Australia | 260—858UX |
| 893,075 | 4/1962 | Great Britain | 260—2.5UX |

HOSEA E. TAYLOR, Primary Examiner

H. S. COCKERAM, Assistant Examiner

U.S. Cl. X.R.

260—77.5

UNITED STATES PATENT OFFICE
CERTIFICATE OF CORRECTION

Patent No. 3,553,172          Dated  January 5, 1971

Inventor(s)  WILHELM THOMA ET AL

It is certified that error appears in the above-identified patent and that said Letters Patent are hereby corrected as shown below:

| Column | Line | Error |
| --- | --- | --- |
| 1 | 60 | "dicaryoxylic" should be --- dicarboxylic --- |
| 2 | 39 | "differnt" should be --- different--- |
| 4 | 25 | "C-M-," should be --- o-,m-,--- |
| 4 | 27 | " bixtures " should be --- mixtures --- |
| 5 | 27 | "((a)-(b))" should be ---(a-c)--- |
| 5 | 30 | "cycols" should be --- glycols --- |
| 6 | 48&49 | should change positions "threads" comes after "Micro Hardness". |

Signed and sealed this 19th day of October 1971.

(SEAL)
Attest:

EDWARD M.FLETCHER,JR.          ROBERT GOTTSCHALK
Attesting Officer              Acting Commissioner of Paten